INVENTOR:
Leo V. Skinner

Sept. 29, 1959 L. V. SKINNER 2,907,023
GROUND CLEARANCE INDICATOR
Filed April 27, 1955 5 Sheets-Sheet 3

INVENTOR:
Leo V. Skinner
BY

Sept. 29, 1959 L. V. SKINNER 2,907,023
GROUND CLEARANCE INDICATOR
Filed April 27, 1955 5 Sheets-Sheet 5

INVENTOR:
Leo V. Skinner
BY

United States Patent Office 2,907,023
Patented Sept. 29, 1959

2,907,023

GROUND CLEARANCE INDICATOR

Leo V. Skinner, Albuquerque, N. Mex., assignor to the United States of America as represented by the United States Atomic Energy Commission Application April 27, 1955, Serial No. 505,066

6 Claims. (Cl. 343—14)

This invention relates to an improved system for the determination of distance from one object to another using a frequency-modulated radar signal emitted from one object and received by it after reflection from the other. Such systems are in common use for determining the altitude of an airplane and in mechanisms for the automatic firing of missiles. The presently described system provides an indication of any desired type when the ranging object reaches a specified distance from the object to be ranged.

The general object of the invention, therefore, is to provide an improved system of distance measurement by frequency-modulated radar signals.

Another object is to provide an improved frequency-modulated radar system for indicating the attainment of a prescribed minimum distance from an object under observation.

In the system herein disclosed there is radiated by the emitting object an average carrier frequency which may be of the order of several hundred megacycles per second, and the triangular modulating wave may be symmetrical or asymmetrical. Each type of modulation is contemplated in the present invention, where the carrier frequency is varied between $F+\Delta F$ and $F-\Delta F$. In the description of the invention, symmetrical triangular modulation will be termed simply "triangular," while the asymmetrical type will be termed "sawtooth."

A specific object of the invention is thus to provide an improved radar system using frequency modulation in accordance with a triangular modulating wave.

One illustration of the prior art systems using frequency-modulated radar is that disclosed by Espenschied and Newhouse, "A Terrain Clearance Indicator," in the Bell System Technical Journal, vol. 18, pages 222-234, 1939. Another is the disclosure of U.S. Patent 2,453,169, granted November 9, 1948 to R. H. Varian, entitled "Radio Ground Clearance Indicator." Still another is that of U.S. Patent 2,454,673, granted November 23, 1948 to R. C. Sanders, Jr., entitled "Radio Bomb Release System."

Besides frequency-modulated radars with which the present invention is concerned, there have been used pulse-type radars. These are sufficiently satisfactory at great distances but are not entirely so at short distances. On the other hand, most continuous-wave radars work well at low but not so well at high altitudes. The present invention overcomes the deficiencies of each type.

Thus an object of the invention is the provision of a radar system which shall be operative over the entire range of altitudes of interest.

The present invention requires for its receiver a much narrower frequency band width than other radars of the same type and, by virtue of this narrow band width, has a better signal-to-noise ratio and a greater freedom from jamming by unwanted signals accidentally or purposely created. These are important features of the invention.

The invention itself will be understood from the following description of a preferred embodiment thereof read with reference to the accompanying drawings, in which.

Figure 1:
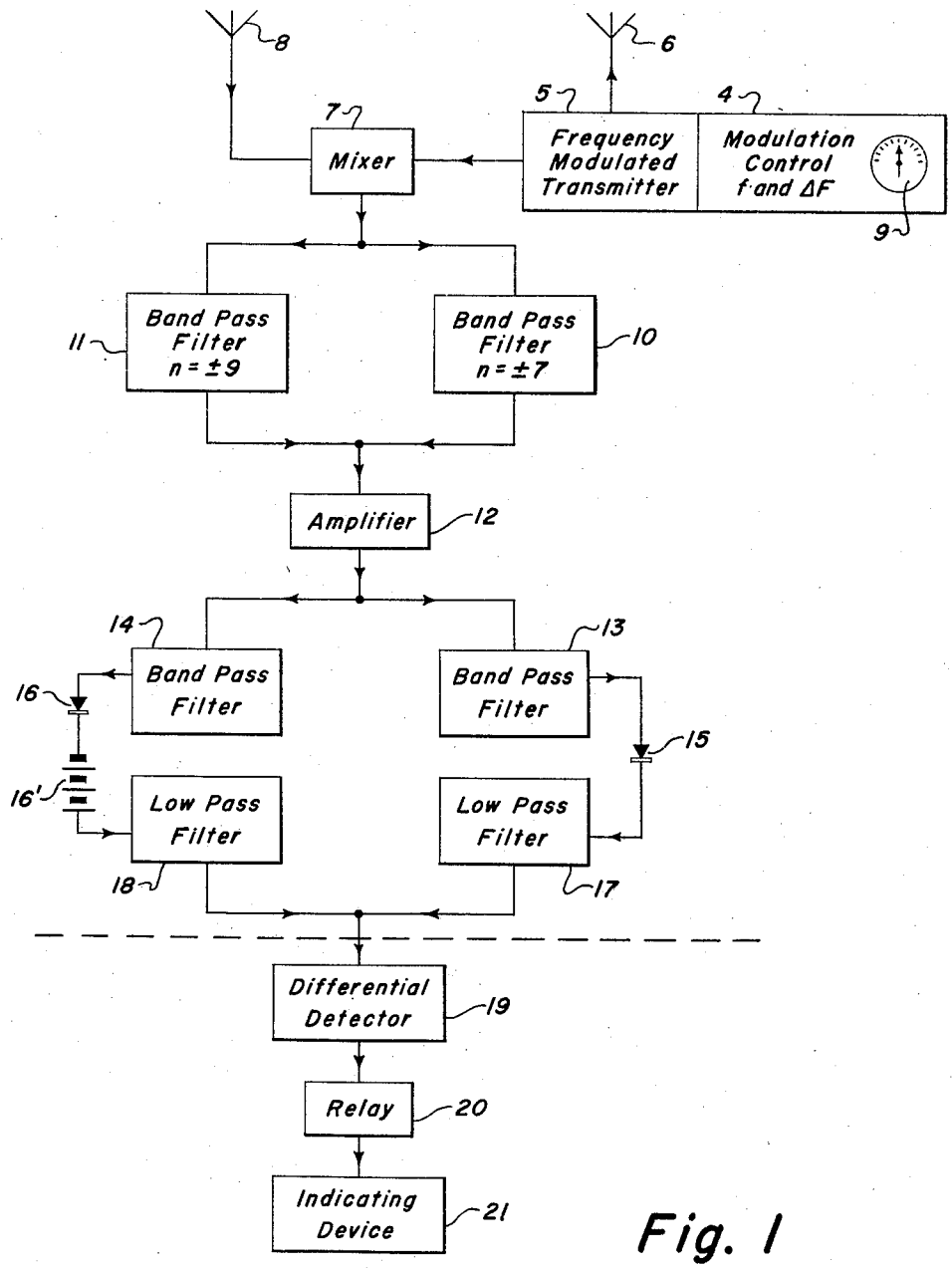
Fig. 1 is a block schematic of the system of the invention.
Figure 3:
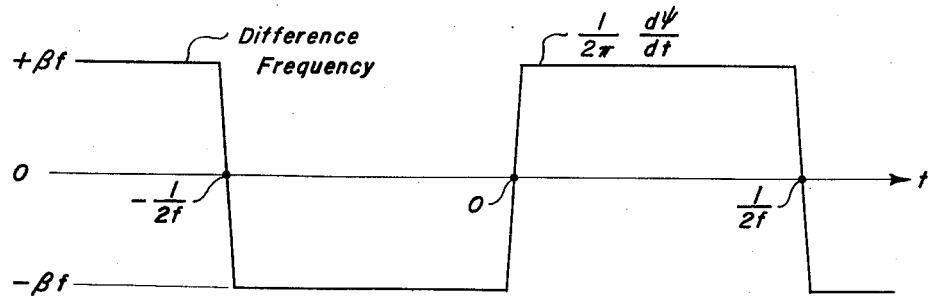
Fig. 3 is illustrative of the difference frequency delivered by the mixer of Fig. 1 as a function of time corresponding to Fig. 2.
Figure 5:
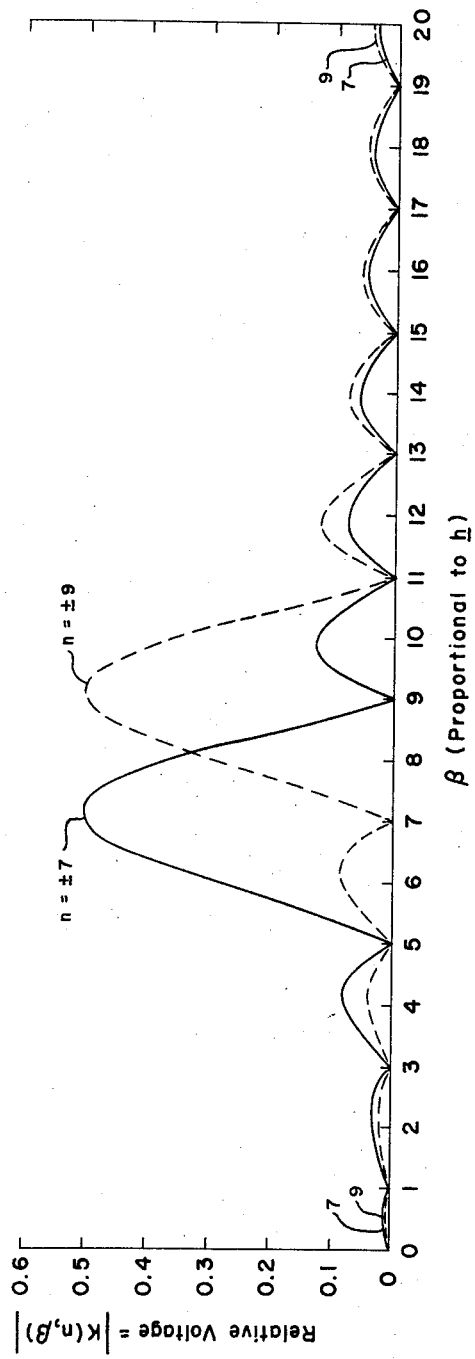
Fig. 5 is a plot of relative amplitude vs. height for two arbitrarily selected frequency components of Fig. 4.
Figure 6:
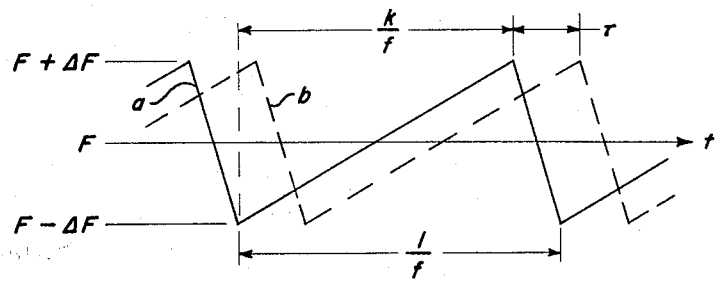
Fig. 6 shows curves analogous to those of Fig. 2 but pertaining to sawtooth frequency modulation.
Figure 7:
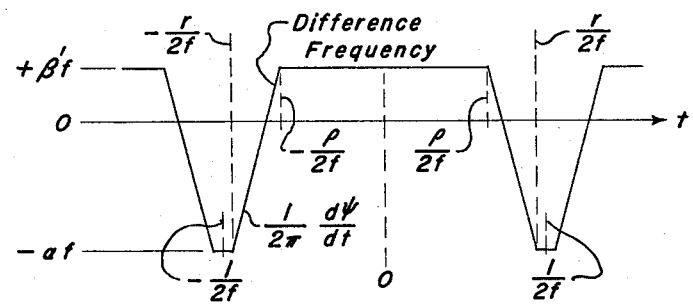
Figure 8:
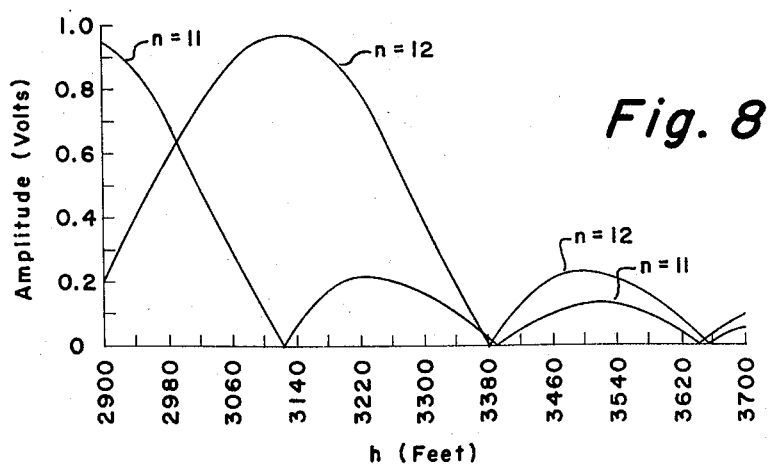

Fig. 7, analogous to Fig. 3, exhibits the difference frequency delivered by the mixer of Fig. 1 as a function of time, corresponding to Fig. 6; and Fig. 8 is a plot, corresponding to Fig. 5, for the case of sawtooth modulation.

It will later be pointed out that the block schematic of Fig. 1 is generically applicable to both types of frequency modulation, triangular or sawtooth.

Whatever the type of frequency modulation employed in a radar distance measuring system, a portion of the transmitted wave is conveyed to a nonlinear mixer and therein compared with the reflected wave. The waveform of the latter is identical with that of the transmitted wave but is delayed by a time interval $$\tau = \frac{2h}{c}$$

where $h$ and $c$ are respectively the distance to be measured and the velocity of light. The difference frequency at any instant is thus proportional to the distance and to the maximum frequency change produced in the modulation of the carrier frequency. At any distance $$h = \frac{c\tau}{2}$$

and the mixer output frequency has a maximum value $\beta f$ where $f$ is the frequency of modulation and $$\beta = 4\Delta F\tau = 8\Delta F\frac{h}{c}$$

In the case of triangular modulation, if $\tau$ is much smaller than $1/f$, the time variation of difference frequency is approximately square. This case will be first considered and later the general case of trapezoidal variation.

Before entering on the detailed description of the figures, it is well to note that a frequency-modulated wave may be regarded as a wave of average frequency periodically varied in frequency. The instantaneous frequency may be written as:

$$F_i = \frac{1}{2\pi}\left(\Omega + \frac{d\psi}{dt}\right) \quad (1)$$

where $\Omega = 2\pi F$ and $$\frac{d\psi}{dt}$$

is the average frequency modulated at repetition rate $$f = \frac{1}{2\pi}\frac{d\psi}{dt}$$

It may be shown that the instantaneous voltage of the wave may be stated as $$V = A \cos(\Omega t + \psi - \phi) \quad (2)$$

where $A$ is an arbitrary constant designating the maximum absolute value of the periodic voltage function V, $\psi$ is a function of time of period $$\frac{1}{f} = \frac{2\pi}{\omega}$$

and $\phi$ is an arbitrary constant phase angle.

Such a wave, delayed in time proportionally to the distance from transmitter to ground or other reflecting surface, is beat in a nonlinear mixer with the wave being directly transmitted. There results at the output of the mixer a voltage representing the difference frequency which is proportional to the distance to be measured. The instantaneous output voltage then has the form $$V_1 = A \cos(\psi - \phi) \quad (3)$$

In Equation 3 no account is taken of relative motion between transmitter and reflecting object. If $h$ is the distance, say altitude, which is changing at the rate $$\frac{dh}{dt}$$

a Doppler frequency is present, represented by $$f_d = -\frac{2F}{c}\frac{dh}{dt}$$

which adds algebraically to the mixer output frequency when the reflecting object is being approached $$\left(\frac{dh}{dt} \text{ negative}\right)$$

Including this frequency, Equation 3 may be written $$V_1 = A \cos(\omega_d t + \psi - \phi) \quad (4)$$

where $\omega_d = 2\pi f_d$.

A frequency analysis of Equation 4 may be obtained for a periodic square wave as shown by B. van der Pol (Frequency Modulation, Proceedings Institute of Radio Engineers, vol. 18, page 1202, July 1935). Such frequency analysis, assuming $f_d$ less than $\tfrac{1}{2}f$, gives for $V_1$ the expression $$v = \frac{2A\beta}{\pi}\sum_{n=-\infty}^{n=\infty} \frac{\sin\left[\frac{\pi}{2}(\beta+n)\right]}{\beta^2 - n^2} \cos[(\omega_d - n\omega)t - \phi] \quad (5)$$

where $n$ is an integer, positive or negative. The amplitudes of the various frequency components are given by the term preceding the cosine term in the right hand member of Equation 5. At this point it must be noted that in the presence of Doppler frequency $f_d$ plays the role of a new carrier frequency modulated by $f$. The restriction in the analysis to $f_d < \tfrac{1}{2}f$ is only for convenience in making the illustrative plots of Figs. 4 and 5.

Choosing $A=1$, $\beta = 7.5$, one may plot for various values of $n$ the peak amplitudes of the frequency components and for various values of $\beta$ (a dimensionless quantity) the variation in peak voltage amplitude as a function of $\beta$ for the component corresponding to a chosen value of $n$. For the latter plot the peak amplitude of $V_1$ is given by $$|K(n,\beta)| = \left|\frac{2\beta \sin\left[\frac{\pi}{2}(\beta+n)\right]}{\pi(\beta^2 - n^2)}\right| \quad (6)$$

where $|K(n,\beta)|$ denotes the absolute value of an arbitrary function, K, of $n$ and $\beta$ as defined by the right hand member of this equation.

If we recall that $\beta = 4\Delta F \tau$ and that $$\tau = \frac{2h}{c}$$

we see that for a given value of $\beta$, $$\Delta F \cdot h = \frac{c\beta}{8}$$

Writing $\Delta F$ in megacycles and $c$ in feet per microsecond, $\Delta F \cdot h = 123\beta$ approximately, where $h$ is in feet.

Referring now to Fig. 1, numeral 5 designates a frequency-modulated radar transmitter, the operator of the system being assumed to have control of the carrier frequency and, by use of modulation control 4, the extent and repetition rate of the modulation. The modulation $\Delta F$ is usually about 1% of the carrier frequency F and the repetition rate $f$ may be a few kilocycles per second. Transmitter 5 supplies frequency-modulated energy to transmitting antenna 6 carried on the same vehicle and at the same time supplies to nonlinear mixer 7 of known type a convenient amount of like energy. From antenna 6 the energy supplied by transmitter 5 is radiated in a cone of any desired angle to a reflecting object from which a portion of the radiated energy is reflected to receiving antenna 8 carried by the same vehicle as transmitter 5. Indicated in modulation control 4 is a height reading dial 9, as will be later explained.

The reflected energy has the same wave form as that transmitted but is delayed in phase proportionally to the distance between transmitting and receiving antennas and the reflecting object. The time of this delay, as above stated, is $$\tau = \frac{2h}{c}$$

the travel time over the double distance from source to object. The beat frequency from mixer 7 is then at any instant equal to the difference between the two frequencies, that directly received from transmitter 5 and that received after reflection. Neglecting for the moment the Doppler frequency, Equation 3 applies.

The mixer output voltage $V_1$ is applied in parallel to band pass filters 10 and 11. The bands passed by these filters correspond to different values of $n$ in Equation 5, chosen as will be explained in connection with Figs. 4 and 5. Filters 10 and 11 pass much less than the whole energy received from mixer 7, and amplifier 12 is used to raise to an adequate level the energy of the corresponding component frequencies. After amplification, filters 13 and 14, respectively like filters 10 and 11, further purify the frequency components.

After passage by filters 13 and 14 the two component waves are rectified by conventional rectifiers 15 and 16, and low-pass filters 17 and 18 respectively suppress the ripples remaining in the rectified waves from filters 13 and 14, only frequencies below, say, 50 c.p.s., being transmitted.

After this last filtration the rectified voltages representative of the chosen frequency components are applied to differential detector 19, which may be of conventional design and giving a differential output which when equal to zero releases relay 20. Relay 20 is likewise conventional and adapted to operate, when its coil current vanishes, any suitable indicating device 21. The choice of the type of indication provided by device 21 depends upon the type of operation it is intended to bring about. That operation may be the production of an optical or an auditory signal or the firing of the warhead of a missile. Between rectifier 16 and filter 18 there is introduced biasing battery 16', the purpose of which is to prevent premature operation of relay 20. This will be explained in the description of Fig. 5.

Figure 2:
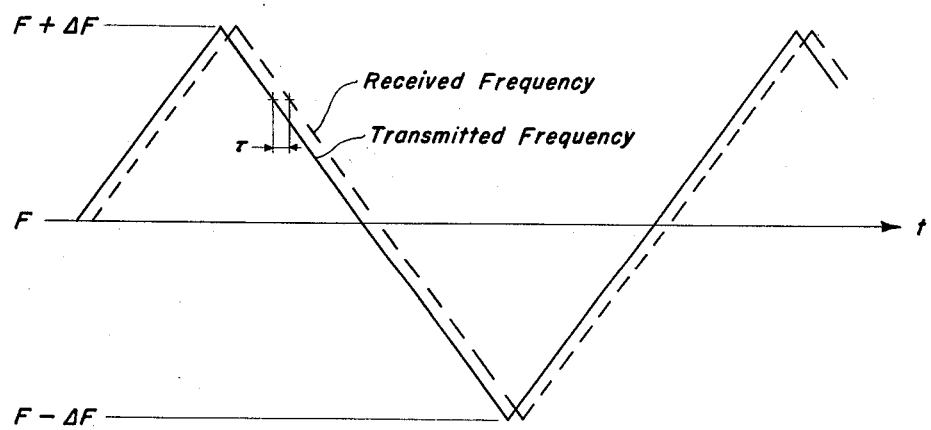
Fig. 2 shows curves representing, for triangular frequency modulation, the instantaneous frequencies of the transmitted and the received wave as functions of time.

Fig. 2 exhibits the frequency vs. time relations for the transmitted and received radar waves, of average frequency F symmetrically varied between $F + \Delta F$ and $F - \Delta F$, with the phase delay $\tau$ assumed a small fraction of the period $$\frac{1}{f}$$

of the frequency modulation. No Doppler frequency is represented; such, if present, with $$\frac{dh}{dt}$$

negative, would raise all the points of the dashed graph representing the received frequency.

If $\tau$ is taken as not more than, say, $$\frac{1}{40f}$$

the difference in frequency at any moment between the transmitted and the received wave may be practically represented as a square wave of difference frequency vs. time. Moreover, the presence of a Doppler frequency brings it about that the amplitudes of the component frequencies are not strictly constant and that $\psi$ is not strictly periodic. However, it may be assumed for practical purposes that a Fourier analysis may be used and that slow changes in amplitude and slight changes in $\beta$ in any one period of frequency modulation will mean only a slight broadening of the spectral lines of the frequency analysis.

Fig. 3 shows the time variation of the difference frequency, which is that of the output of a mixer 7, Fig. 1. The plot of difference frequency crosses the zero line at points $\frac{1}{2}f$ apart in time and reaches, in the absence of a Doppler frequency, positive and negative plateaus at $\beta f$ and $-\beta f$. Under the simplifying assumptions made, the passage between these extremes is substantially vertical. The difference frequency may be designated by $$\frac{1}{2\pi}\frac{d\psi}{dt}$$

where $\psi$, as earlier defined, is the phase angle between transmitted and reflected waves. To the graph of Fig. 3, Equation 5 is applicable.

Figure 4:
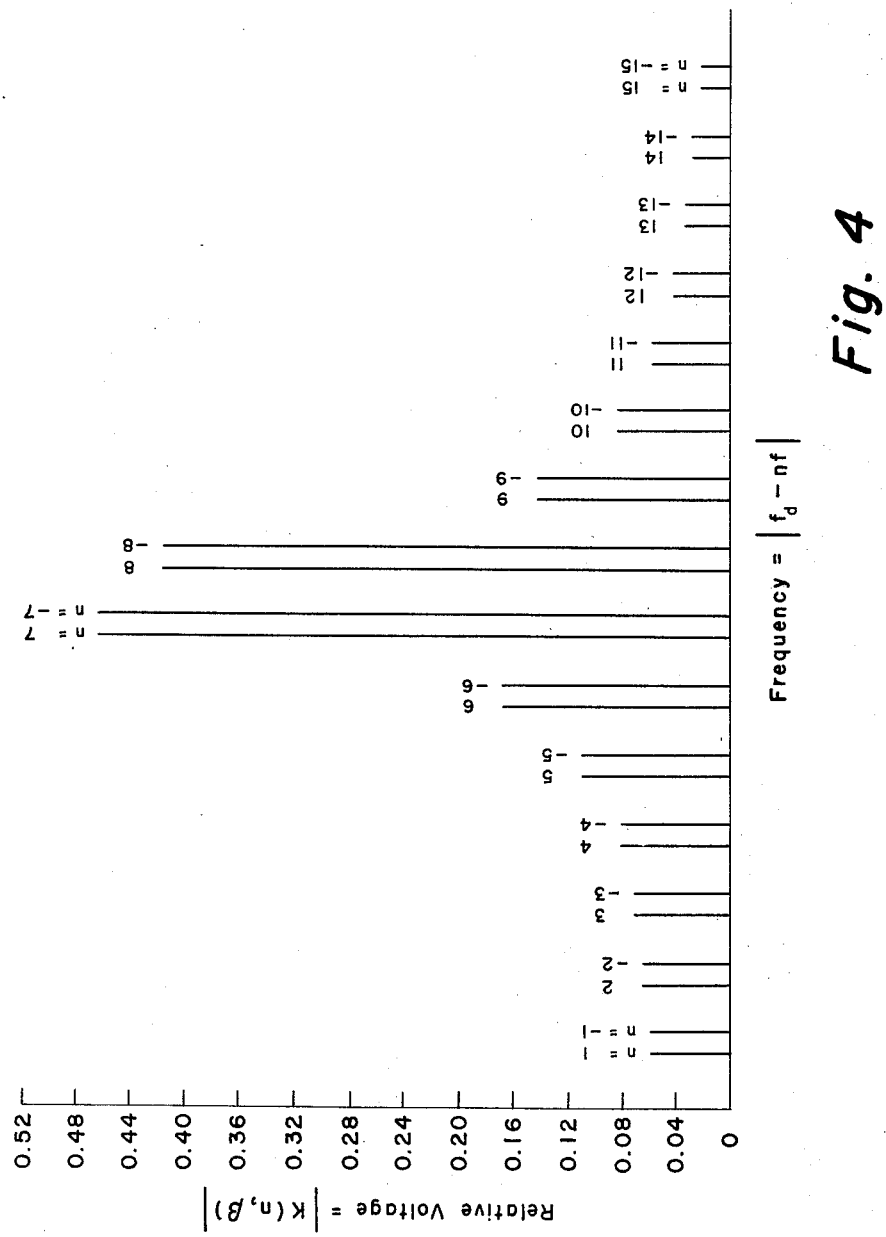
Fig. 4 is an illustrative representation of relative amplitude vs. frequency of a number of the components of the wave of Fig. 3.

Fig. 4 is a plot of $|K(n,\beta)|$, Equation 4, as a function of frequency, $\beta$ being taken as 7.5 and $A=1$. The abscissas are the frequency of the components modulated by the Doppler frequency, $f_d-nf$, the argument of the cosine term of Equation 5. At this value of $\beta$ the computations resulting in Fig. 4 show that the greatest amplitude appears at the frequency component corresponding to $n=7$. Were no Doppler frequency present the frequency pairs would condense into a line midway between the members of the pairs. In each doublet the members are of equal amplitude and are separated in frequency by twice the Doppler frequency, while the centers of the doublets are separated by the frequency of modulation $f$. The selection of $f_d$ less than $$\frac{f}{2}$$

obviously permits plotting components without confusing overlapping of doublet members corresponding to different values of $n$. The restriction is clearly not indispensable.

Fig. 5 is a plot of relative voltage amplitudes of the components $n=\pm7$ and $n=\pm9$ as functions of $\beta$. It will be observed that the solid curve $n=\pm7$ and the and the dotted curve $n=\pm9$ intersect at $\beta=8.05$. This result is made use of by differential detector 19 of Fig. 1. In Fig. 5 zeros of both curves occur at $\beta=0$ to 5 and 11 to 19. Between $\beta=5$ and $\beta=11$, the curve for $n=\pm7$ zeros at $\beta=9$; the curve for $n=\pm9$, at $\beta=7$. Similar results are found in plotting the curves for $n=\pm3$ and $n=\pm5$, likewise for the curves $n=\pm15$ and $n=\pm17$, in general for any two consecutive odd values of $n$ greater than one.

One is not restricted to odd values of $n$. Even values differing by two may be chosen, provided a harmonic of the lower frequency component does not coincide with the fundamental of the higher. For example, 2 and 4 are inadmissible, but 4 and 6 etc. may be used. For a like reason, the combination $n=1$ and $n=3$ should be avoided.

We see that, except for the zeros, the two curves intersect at one point only; in the case shown in Fig. 5, at $\beta=8.05$. At higher values of $\beta$ the curve for $n=\pm9$ has ordinates greater than those for the curve $n=\pm7$; conversely for $\beta$ less than 8.05. Recalling that $$\beta=8\Delta F\frac{h}{c}$$

we see that for a chosen $\beta$ and a fixed modulation $\Delta F$ of the radiated carrier frequency there is only one value of $h$ at which the curves have equal ordinates. The altitude of the carrying vehicle is thus determinable.

In Fig. 1 a horizontal dashed line separates detector 19 from the elements preceding. This is for the reason that the invention herein disclosed may substitute other means, all well known, for those designated by numerals 19 and 20 and for indicating device 21. Indicating device 21 may take any form, depending on the indication desired. It is necessary only to provide apparatus responsive to the equality of amplitudes of the frequency components chosen, avoiding their simultaneous zeros in the plots of Fig. 5.

Also, in Fig. 1, dial 9 controls the extent $\Delta F$ to which the radiated carrier frequency F is modulated. Recalling the relation $\Delta F.h = 123\beta$, after choosing $\beta$ dial 9 may be graduated in feet so that by setting the dial to a prescribed value of $h$ an indication shall be obtained when that ground clearance is reached in descent, or at any altitude the operator may rotate dial 9 until the indicator responds. Dial 9 then shows the operator's altitude.

The band width of ordinary frequency-modulated radar altimeters covers the entire range of frequencies indicated in Fig. 4, or even more. In the presently disclosed system the band width is somewhat more than four times the maximum Doppler frequency $$f_d = -\frac{2F}{c}\frac{dh}{dt}$$

Making F as low as consistent with other requirements reduces correspondingly the Doppler frequency for any speed of approach of transmitter to reflecting object. This brings about not only a reduction in Doppler frequency but also permits narrowing of the band width required for the receiving system and for band pass filters 10, 11, 13 and 14. All of these features increase the signal-to-noise ratio of the receiving system and increase the system's immunity to jamming by interfering signals.

In practice it is convenient to choose $\beta$, $f$ and $F$, leaving for control by the operator only $\Delta F$. The relations between these quantities have been stated in the foregoing. They are chosen with reference to the conditions of use, namely, the range of altitudes over which it is expected to use the invention and the Doppler frequency it is expected to meet. For example, choose $\beta=8.05$, $f=1.2$ kc., $F=200$ mc. It is desired to use the invention at altitudes between 200 and 10,000 feet and allow for a maximum Doppler frequency of 600 c.p.s. This Doppler frequency corresponds to a speed of approach equal to 1500 feet per second, approximately. The table below exhibits the quantities appropriate to the heights 200 and 10,000 feet:

$\beta = 4\Delta F.\tau$
$\Delta F.h = 990$ for $\beta = 8.05$

| $h=200$ feet | $h=10,000$ feet |
|---|---|
| $\tau=0.4$ ms. | $\tau=20$ ms. |
| $\Delta F=5$ mc. | $\Delta F=0.1$ mc. |
| $f=1200$ c.p.s. | $f=1200$ c.p.s. |
| $f_d=600$ c.p.s. | $f_d=600$ c.p.s. |
| $F=200$ mc. | $F=200$ mc. |
| $\dfrac{dh}{dt}=1500$ feet/sec. | $\dfrac{dh}{dt}=1500$ feet/sec. |

In the above table the constants chosen make $\beta f=9.65$ kc. and the filters corresponding to $n=7$ and $n=9$ will have respectively centers at 8.4 and 10.8 kc. Each filter band width may be appropriately 2 kc.

The above account describes the invention as an altimeter over a wide range of altitudes, the accuracy being limited only by the sensitivity of the detecting elements.

As a weapon fuse, the invention is used to provide fusing at a low altitude, say, a few hundred feet, by setting $$\beta F = 123 \frac{\beta}{h}$$

before the weapon is launched. For $\beta=8.05$ and $h=300$ feet, $\Delta F=3.3$ mc. and $\tau=0.6$ microsecond. The repetition rate of modulation may in this case be some 40 kc., making $\beta f=332$ kc. and requiring appropriate changes in the central frequency of the band filters.

It has been indicated that sawtooth frequency modulation of the radiated wave is within the ambit of the invention. The mathematical analysis leads to different expressions in the two types of modulation, but the block diagram of the system of apparatus in Fig. 1 is the same for both, it being necessary to design filters 10, 11, 13 and 14 of Fig. 1 to pass other bands than those concerned when the frequency modulation is triangular.

Figs. 6, 7 and 8 relate to the use of the invention in dealing with a sawtooth frequency (curves $a$ and $b$ of Fig. 6) where the rise of frequency from $F-\Delta F$ to $F+\Delta F$ is assumed to continue linearly with time for 498 microseconds while the return requires two microseconds. The ratio of rise time to total period of modulation is $$k = \frac{0.996}{f}$$

$1/f$ being, as before, the period of the sawtooth. This is a practically attainable ratio, curves $a$ and $b$ are respectively the radiated and the received frequencies. In the difference frequency derived from the mixer and shown in Fig. 7 there is a much greater change downward from the average frequency represented by base line 0 than the upward change.

In Fig. 6 it is assumed for illustration that $\tau$, the time of travel of the radiated wave to the reflecting object and back, is longer than the flyback time and shorter than the rise time. This assumption leads to the diagram of frequency difference shown in Fig. 7.

It is convenient here to define the symbols $\rho$, $\beta'$, $r$ and $\alpha$, noting that $r$ and $\alpha$ must be defined with account taken of the interval $\tau$ and the height $h$. As just stated, $\tau$ is intermediate between the flyback and the rise time of frequency change. Appropriately to Fig. 7, we take $$\frac{c(1-k)}{2f} < h < \frac{ck}{2f}$$

where $c$ is the velocity of light, $f$ the repetition rate of the modulation, and $k$ has already been defined. These limits of $h$ are concordant with those assumed for $\tau$. The defined quantities are then as follows:

$$\rho = k - f\tau = k - \frac{2fh}{c}$$

$$\beta' = \frac{2\Delta F \cdot \tau}{k} = \frac{4\Delta F \cdot h}{ck}$$

$$r = 2 - k - f\tau = 2 - k - \frac{2fh}{c}$$

and $$\alpha = \frac{2\Delta F}{kf}(1-f\tau) = \frac{2\Delta F}{ckf}(c-2fh)$$

The Doppler frequency is, as before, $$f_d = -\frac{2F}{c}\frac{dh}{dt}$$

In the above tabulation it is noted that $\beta'f$ defines the maximum elevation of mixer output frequency above the average frequency. This is because in the modulation of Fig. 6 the slope of the line representing the change of radiated frequency from $F-\Delta F$ to $F+\Delta F$ is about half $$\left(\frac{1}{2k}\right)$$

as great as that of the corresponding line in Fig. 2. Therefore $$\beta' = \frac{1}{2k}\beta$$

We may write for the instantaneous voltage of the wave from the mixer $$v = A \cos(2\pi f_d t + \psi - \phi)$$

where $\psi$ and $\phi$ have the same significance as for the case of triangular modulation.

The frequency analysis for this case may be obtained as described on pages 29 and 30, Transactions of the I.R.E., Professional Group on Circuit Theory, June 1954, "Spectra of Waves with Periodic Modulations," Leo V. Skinner. It is deemed unnecessary here to set forth the details of the analysis.

Performing the analysis indicated in the reference publication, we are led to choose consecutive integral values on $n$, say 11 and 12, and plot the curve shown in Fig. 8. These values of $n$ are illustrative only; any other consecutive integers may be chosen, subject to the restriction that the harmonic of the lower frequency shall not coincide with, or fall close to, the fundamental of the higher. This excludes the choice of 1 and 2, for example.

Figs. 6, 7 and 8 are drawn to a smaller scale than Figs. 2, 3 and 5, but the noteworthy feature is the same in Figs. 5 and 8, namely intersection of the amplitude curves for the values of $n$ chosen. A difference between Fig. 5 and Fig. 8 is that while in the former there are simultaneous zeros remote from the intersection of interest, there are none such in the latter figure. In Fig. 8, on the other hand, there are numerous intersections at low amplitude remote from the principal one. This fact, as does the fact of simultaneous zeros in Fig. 5, leads to appropriate biasing, say of the component for which $n$ is greater, as described in connection with Fig. 5, by the adjustment of biasing battery 16' of Fig. 1.

The $h$ scale (9 in Fig. 1) requires different calibrations for the cases of triangular and of sawtooth modulation, but, aside from this change and the changes in band width of filters 10 and 11 and the like change for filters 13 and 14 respectively, the system of Fig. 1 is adapted to both types of modulation.

I claim:

1. A distance measuring system comprising means for generating an electromagnetic wave of radar frequency, means for modulating the wave in frequency as a symmetrical triangular function of time at a desired repetition rate and throughout a controllable range of modulation, means for radiating the modulated wave, means for receiving the wave after reflection from an object to be ranged, means for comparing in frequency the radiated wave and the received wave to derive a square wave representative of the difference frequency therebetween, means for selecting from the derived wave a pair of component frequencies both multiples greater than one of the repetition rate and differing in frequency by at least said rate, means for individually rectifying the selected component frequencies, means for preferentially biasing one of the rectified component frequencies, means for comparing in amplitude the selected components, indicating means responsive to substantial equality in amplitude of the rectified components, and means for controlling the range of modulation to bring about said equality.

2. A distance measuring system comprising means for generating an electromagnetic wave of radar frequency, means for modulating the wave in frequency as a symmetrical triangular function of time at a desired repetition rate and throughout a controllable range of modulation, means for radiating the modulated wave, means for receiving the wave after reflection from an object to be ranged, means for comparing in frequency the radiated wave and the received wave to derive a square wave representative of the difference frequency therebetween, means for selecting from the derived wave a pair of component frequencies odd multiples greater than one of the repetition rate and differing in frequency by at least said rate, means for individually rectifying the selected component frequencies, means for preferentially biasing one of the rectified component frequencies, means for comparing in amplitude the selected components, indicating means responsive to substantial equality in amplitude of the rectified components, and means for controlling the range of modulation to bring about said equality.

3. A distance measuring system comprising means for generating an electromagnetic wave of radar frequency, means for modulating the wave in frequency as a symmetrical triangular function of time at a desired repetition rate and throughout a controllable range of modulation, means for radiating the modulated wave, means for receiving the wave after reflection from an object to be ranged, means for comparing in frequency the radiated wave and the received wave to derive a square wave representative of the difference frequency therebetween, means for selecting from the derived wave a pair of component frequencies even multiples greater than one of the repetition rate and differing in frequency by at least said rate, means for individually rectifying the selected component frequencies, means for preferentially biasing one of the rectified component frequencies, means for comparing in amplitude the selected components, indicating means responsive to substantial equality in amplitude of the rectified components, and means for controlling the range of modulation to bring about said equality.

4. A distance measuring system comprising means for generating an electromagnetic wave of radar frequency, means for modulating the wave in frequency as an asymmetrical triangular function of time at a desired repetition rate and throughout a controllable range of modulation, means for radiating the modulated wave, means for receiving the wave after reflection from an object to be ranged, means for comparing in frequency the radiated wave and the received wave to derive a trapezoidal wave representative of the difference frequency therebetween, means for selecting from the derived wave a pair of component frequencies both multiples greater than one of the repetition rate and differing in frequency by at least said rate, means for individually rectifying the selected component frequencies, means for preferentially biasing one of the rectified component frequencies, means for comparing in amplitude the selected components, indicating means responsive to substantial equality in amplitude of the rectified components, and means for controlling the range of modulation to bring about said equality.

5. A distance measuring system comprising means for generating an electromagnetic wave of radar frequency, means for modulating the wave in frequency as an asymmetrical triangular function of time at a desired repetition rate and throughout a controllable range of modulation, means for radiating the modulated wave, means for receiving the wave after reflection from an object to be ranged, means for comparing in frequency the radiated wave and the received wave to derive a trapezoidal wave representative of the difference frequency therebetween, means for selecting from the derived wave a pair of component frequencies odd multiples greater than one of the repetition rate and differing in frequency by at least said rate, means for individually rectifying the selected component frequencies, means for preferentially biasing one of the rectified component frequencies, means for comparing in amplitude the selected components, indicating means responsive to substantial equality in amplitude of the rectified components, and means for controlling the range of modulation to bring about said equality.

6. A distance measuring system comprising means for generating an electromagnetic wave of radar frequency, means for modulating the wave in frequency as an asymmetrical triangular function of time at a desired repetition rate and throughout a controllable range of modulation, means for radiating the modulated wave, means for receiving the wave after reflection from an object to be ranged, means for comparing in frequency the radiated wave and the received wave to derive a trapezoidal wave representative of the difference frequency therebetween, means for selecting from the derived wave a pair of component frequencies even multiples greater than one of the repetition rate and differing in frequency by at least said rate, means for individually rectifying the selected component frequencies, means for preferentially biasing one of the rectified component frequencies, means for comparing in amplitude the selected components, indicating means responsive to substantial equality in amplitude of the rectified components, and means for controlling the range of modulation to bring about said equality.

References Cited in the file of this patent
UNITED STATES PATENTS

| | | |
|---|---|---|
| 2,407,287 | Labin | Sept. 10, 1946 |
| 2,426,204 | Grieg | Aug. 26, 1947 |
| 2,453,169 | Varian | Nov. 9, 1948 |
| 2,458,429 | Sanders | Jan. 4, 1949 |